US006762877B1

(12) United States Patent
Dasylva et al.

(10) Patent No.: US 6,762,877 B1
(45) Date of Patent: Jul. 13, 2004

(54) TECHNIQUE FOR SELECTIVELY FREQUENCY TRANSLATING OPTICAL CHANNELS IN AN OPTICAL NETWORK

(75) Inventors: Abel C. Dasylva, Ottawa (CA); Delfin Y. Montuno, Kanata (CA); Guoqiang G. Q. Wang, Nepean (CA); Prasad Kodaypak, Ottawa (CA)

(73) Assignee: Nortel Networks Limited, Quebec (CA)

(*) Notice: Subject to any disclaimer, the term of this patent is extended or adjusted under 35 U.S.C. 154(b) by 315 days.

(21) Appl. No.: 10/094,655

(22) Filed: Mar. 12, 2002

Related U.S. Application Data

(60) Provisional application No. 60/317,443, filed on Sep. 7, 2001.

(51) Int. Cl.[7] .............................. G02F 1/365; G02B 6/35

(52) U.S. Cl. .......................... 359/332; 359/326; 385/17

(58) Field of Search ................................. 359/326–332; 385/16, 17, 24

(56) References Cited

U.S. PATENT DOCUMENTS

| 5,825,517 A | 10/1998 | Antoniades et al. ........ 359/117 |
| 6,259,836 B1 * | 7/2001 | Dodds ......................... 385/24 |
| 2002/0118439 A1 * | 8/2002 | Batchko ..................... 359/326 |

OTHER PUBLICATIONS

Achille Pattavina, Switching Theory Architecture and Performance in Broadband ATM Networks, Sections 2.3.1, 3.2, and 4.2, 1998.

Byrav Ramamurthy, Wavelength Conversion in WDM Networking, IEEE Journal on Selected Areas in Communications, Sep. 1998, vol. 16., No. 7, pp. 1067–1073.

S. J. B. Yoo, Wavelength Conversion Technologies for WDM Network Applications, Journal of Lightwave Technology, Jun. 1996, vol. 14, No. 6, pp. 955–966.

N. Antoniades, An Architecture for a Wavelength–Interchanging Cross–Connect Utilizing Parametric Wavelength Coverters, Journal of Lightwave Technology, Jul. 1999, vol. 17, No. 7, pp. 1113–1125.

Dong–Jye Shyy, $Log_2$ (N,m,p) Strictly Nonblocking Networks, IEEE Transactions on Communications, Oct. 1991, vol. 39, No. 10, pp. 1502–1510.

Chin–Tau Lea, Tradeoff of Horizontal Decomposition Versus Vertical Stacking in Rearrangeable Nonblocking Networks, Jun. 1991, IEEE Transactions on Communications, vol. 39, No. 6, pp. 899–904.

W. Kabacinski, et al., Wide–Sense Non–blocking $MultiLog_2$ N Broadcast Switching Networks, 2000 IEEE, pp. 1440–1444.

Chin–Tau Lea, Bipartite Graph Design Principle for Photonic Switching Systems, IEEE Transactions on Communications, Apr. 1990, vol. 38, No. 4, pp. 529–538.

(List continued on next page.)

* cited by examiner

*Primary Examiner*—John D. Lee
(74) *Attorney, Agent, or Firm*—Hunton & Williams LLP

(57) ABSTRACT

A technique for selectively frequency translating optical channels in an optical network is disclosed. In one exemplary embodiment, the technique is realized as a method for selectively frequency translating optical channels in a system having W optical frequencies. The method comprises selectively directing an optical channel operating at a respective one of the W optical frequencies based at least in part upon the respective optical frequency of the optical channel. The method also comprises shifting the respective optical frequency of the selectively directed optical channel by an amount defined by $\pm 2^i \Delta f$, wherein $\Delta f$ is an optical frequency spacing between adjacent optical channels, and $i = 0, 1, \ldots \log_2 W - 1$.

20 Claims, 12 Drawing Sheets

OTHER PUBLICATIONS

M. H. Chou, et al., 1.5 um–band wavelength conversion based on difference–frequency generation in $LiNbO_3$ waveguides with integrated coupling structures, Optics Letters, Jul. 1, 1998, vol. 23, No. 13, pp. 1004–1006.

M. H. Chou et al, Multiple–channel wavelength conversion by use of engineered quasi–phase–matching structures in $LiNbO_3$ waveguides, Optics Letters, Aug. 15, 1999, vol. 24, No. 16, pp. 1157–1159.

M.–S. Chou, et al., Optical frequency mixers for WDM and TDM applications, pp. 16–18, no journal name or date.

Kou–Chun Lee, et al., Optimization of a WDM Optical Packet Switch with Wavelength Converters$_1$, 1995 IEEE, pp. 423–430.

Chin–Tau Lea, Crossover Minimization in Directional–Coupler–Based Photonic Switching Systems, IEEE Transactions on Communications, Mar. 1988, vol. 36, No. 3, pp. 355–363.

F. K. Hwang, Choosing the Best logk(N, m, p) Strictly Nonblocking Networks, IEEE Transactions On Communications, vol. 46, No.4, Apr. 1998, pp. 454–455.

A. Dasylva et al., B–ary Twisted Benes Networks, Nortel Networks, Feb. 26, 2002, pp. 1–4.

A. Dasylva et al, Logb(N, m, p) Wavelength–Interchanging Cross–Connects with Wave–Mixing Frequency–Translation, Nortel Networks, Sep. 12, 2002, pp. 1–5.

| Blocking Property | Parity of $n+m$ | Lower-bound on p |
|---|---|---|
| SR | Even/odd | 1 |
| RNB | Even/odd | $2^{\frac{n-m}{2}}$ |
| SNB | Even | $\frac{3}{2} \cdot 2^{\frac{n-m}{2}} + m - 1$ |
| | Odd | $2^{\frac{n-m+1}{2}} + m - 1$ |

Figure 12

TECHNIQUE FOR SELECTIVELY FREQUENCY TRANSLATING OPTICAL CHANNELS IN AN OPTICAL NETWORK

CROSS-REFERENCE TO RELATED APPLICATIONS

This patent application claims priority to U.S. Provisional Patent Application No. 60/317,443, filed Sep. 7, 2001, which is hereby incorporated by reference herein in its entirety.

FIELD OF THE INVENTION

The present invention relates generally to optical switching and, more particularly, to a technique for selectively frequency translating optical channels in an optical network.

BACKGROUND OF THE INVENTION

All-optical wavelength conversion plays an important role in transparent wavelength division multiplexing (WDM) networks. For example, it enables better network utilization, network transparency to bit-rates and to packet formats, as well as simpler network management. Until recently, two wavelength conversion techniques have been popular involving either cross-gain or cross-phase modulation. However, these solutions are limited by the single input or output capability of cross-gain or cross-phase converters.

The first proposed wavelength-interchanging cross-connects are based on cross-gain or cross-phase modulation. These designs comprised a central optical space switch and dedicated or shared tunable wavelength converters based on cross-gain or cross-phase modulation. The wavelength converters were placed at inputs, outputs, or shared between inputs and outputs, of the central optical space switch. In this configuration, individual wavelength channels were usually switched in two steps. In one step, the space switch directed individual wavelength channels to the appropriate fibers. In another step, wavelength channels were converted to appropriate wavelengths by a single wavelength conversion operation. For this reason, and for future reference, these previous designs are called single-stage wavelength conversion architectures.

Single-stage designs optimally exploit cross-gain and cross-phase wavelength conversion, while minimizing non-negligible conversion impairments. Yet these single-stage architectures often lead to large photonic wavelength converter requirements. In fact, a non-blocking wavelength-interchanging cross-connect with F fibers and W wavelengths per fiber would require F.W converters based on cross-gain or cross-phase modulation.

Wave-mixing can also provide photonic frequency conversion. Two forms of wave-mixing frequency converters have been demonstrated, which are either based on four-wave mixing or on difference-frequency generation. Four-wave mixing is a nonlinear optical process based on third order nonlinear susceptibilities. It can be described as the interactions of any subset of three waves from a larger set of input waves in a nonlinear medium. For each subset of three interacting waves, a resulting wave is produced with an amplitude proportional to the product of the amplitudes of the interacting waves, and a phase and frequency linearly dependent on the phases and frequencies of the interacting waves.

Four-wave mixing frequency converters have been demonstrated in passive media such as glass fibers and in active media such as semiconductor optical amplifiers. They provide bulk frequency-mirroring and phase conjugation, by mapping each input optical frequency, $f_{in}$, to an output frequency, $f_{out}=2f_p-f_{in}$, where $f_p$ is the frequency of a pump wave. However, the generation of in-band cross-talk severely limits the use of four-wave mixing for bulk frequency-conversion.

Difference-frequency generation is another form of wave-mixing. Unlike four-wave mixing, it is based on second order nonlinear susceptibilities. It is explained by the interaction of each wave from a set of input waves at different frequencies with a high power pump wave in a nonlinear medium. Like four-wave mixing, the interaction of each input wave with the pump wave yields a resulting wave with an amplitude proportional to the product of the amplitudes of the pump and input waves, and a phase and frequency linearly dependent on the phases and frequencies of the input and pump waves. Specifically, difference-frequency generation enables bulk frequency conversion and maps each input wave at some input frequency, $f_{in}$, to another wave at output frequency, $f_{out}=f_p-f_{in}$, where $f_p$ is the frequency of the pump wave. However, unlike four-wave mixing, difference-frequency generation does not generate in-band cross-talk terms. For this reason, difference-frequency generation is a practical alternative to providing wave-mixing bulk frequency conversion, along with other optical signal processing functions.

Bulk frequency conversion, or the ability to simultaneously change the frequencies of several input, waves, is a major advantage of wave-mixing frequency conversion. Unfortunately, this important feature of wave-mixing is unused in single-stage wavelength conversion architectures. Therefore, there is a need for other architectures capable of leveraging the potential of wave-mixing, and of reducing the costs of wavelength-interchanging cross-connects.

One proposed solution involves a family of switches optimized for wave-mixing. These cross-connects provide wavelength conversion in a multi-stage manner, and convert the wavelengths of channels through cascades of elementary frequency conversions. In this proposed solution, 2×2 elements are space switches, while inter-stage connections involve fixed wavelength conversions. This proposed solution is rearrangeably non-blocking, and its converter requirements are half those of dedicated converter architectures (i.e., the all-optical converter requirements are F.W/2). In spite of this improvement, converter requirements remain 0(F.W). This is still too large for practical cross-connects.

In view of the foregoing, it would be desirable to provide a technique for implementing wavelength-interchanging cross-connects which overcomes the above-described inadequacies and shortcomings in an efficient and cost effective manner.

SUMMARY OF INTENTION

According to the present invention, a technique for selectively frequency translating optical channels in an optical network is provided. In one exemplary embodiment, the technique is realized as a method for selectively frequency translating optical channels in a system having W optical frequencies. The method comprises selectively directing an optical channel operating at a respective one of the W optical frequencies based at least in part upon the respective optical frequency of the optical channel. The method also comprises shifting the respective optical frequency of the selectively directed optical channel by an amount defined by $\pm 2^i \Delta f$, wherein $\Delta f$ is an optical frequency spacing between adjacent optical channels, and $i=0, 1, \ldots \log_2 W-1$.

In accordance with other aspects of this exemplary embodiment of the present invention, wherein the optical channel is a first optical channel and the selectively directed optical channel is a first selectively directed optical channel, the method may further beneficially comprise selectively directing a second optical channel operating at another respective one of the W optical frequencies based at least in part upon the respective optical frequency of the second optical channel, wherein the respective optical frequency of the second selectively directed optical channel is the same as the respective optical frequency of the first selectively directed optical channel after it has been shifted.

In accordance with further aspects of this exemplary embodiment of the present invention, wherein the system comprises a plurality of optical waveguides for communicating the W optical frequencies, and wherein a first respective one of the plurality of optical waveguides communicates the first optical channel prior to being selectively directed, the method may further beneficially comprise selectively directing the first optical channel based at least in part upon the first respective one of the plurality of optical waveguides. Analogously, wherein a second respective one of the plurality of optical waveguides communicates the second optical channel prior to being selectively directed, the method may further beneficially comprise selectively directing the second optical channel based at least in part upon the second respective one of the plurality of optical waveguides.

In accordance with still further aspects of this exemplary embodiment of the present invention, wherein the first respective one of the plurality of optical waveguides is identified by a first binary representation, the respective optical frequency of the first selectively directed optical channel may beneficially be shifted by an amount defined by $-2^i\Delta f$ when the first binary representation of the first respective one of the plurality of optical waveguides has an even value. Alternatively, wherein the first respective one of the plurality of optical waveguides is identified by a first binary representation, the respective optical frequency of the first selectively directed optical channel may beneficially be shifted by an amount defined by $+2^i\Delta f$ when the first binary representation of the first respective one of the plurality of optical waveguides has an even value. Alternatively still, wherein the first respective one of thee plurality of optical waveguides is identified by a first binary representation, the respective optical frequency of the first selectively directed optical channel may beneficially be shifted by an amount defined by $-2^i\Delta f$ when the first binary representation of the first respective one of the plurality of optical waveguides has an odd value. Alternatively even still, wherein the first respective one of the plurality of optical waveguides is identified by a first binary representation, the respective optical frequency of the first selectively directed optical channel may beneficially be shifted by an amount defined by $+2^i\Delta f$ when the first binary representation of the first respective one of the plurality of optical waveguides has an odd value.

In accordance with additional aspects of this exemplary embodiment of the present invention, the method may further beneficially comprise selectively directing the first selectively directed optical channel based at least in part upon the first respective one of the plurality of optical waveguides. Analogously, the method may further beneficially comprise selectively directing the second selectively directed optical channel based at least in part upon the second respective one of the plurality of optical waveguides.

In another exemplary embodiment, the technique is realized as an apparatus for selectively frequency translating optical channels in a system having W optical frequencies. The apparatus comprises at least one switching device for selectively directing an optical channel operating at a respective one of the W optical frequencies based at least in part upon the respective optical frequency of the optical channel. The apparatus also comprises at least one optical frequency shifting device for shifting the respective optical frequency of the selectively directed optical channel by an amount defined by $\pm 2^i\Delta f$, wherein $\Delta f$ is an optical frequency spacing between adjacent optical channels, and i=0, 1, . . . $\log_2 W - 1$.

In accordance with other aspects of this exemplary embodiment of the present invention, wherein the optical channel is a first optical channel and the selectively directed optical channel is a first selectively directed optical channel, the at least one switching device may also beneficially selectively direct a second optical channel operating at another respective one of the W optical frequencies based at least in part upon the respective optical frequency of the second optical channel, wherein the respective optical frequency of the second selectively directed optical channel is the same as the respective optical frequency of the first selectively directed optical channel after it has been shifted.

In accordance with further aspects of this exemplary embodiment of the present invention, wherein the system comprises a plurality of optical waveguides for communicating the W optical frequencies, and wherein a first respective one of the plurality of optical waveguides communicates the first optical channel prior to being selectively directed, the apparatus may further beneficially comprise at least one other switching device for selectively directing the first optical channel based at least in part upon the first respective one of the plurality of optical waveguides. Analogously, wherein a second respective one of the plurality of optical waveguides communicates the second optical channel prior to being selectively directed, the at least one other switching device may also beneficially selectively direct the second optical channel based at least in part upon the second respective one of the plurality of optical waveguides.

In accordance with still further aspects of this exemplary embodiment of the present invention, wherein the first respective one of the plurality of optical waveguides is identified by a first binary representation, the respective optical frequency of the first selectively directed optical channel may beneficially be shifted by an amount defined by $-2^i\Delta f$ when the first binary representation of the first respective one of the plurality of optical waveguides has an even value. Alternatively, wherein the first respective one of the plurality of optical waveguides is identified by a first binary representation, the respective optical frequency of the first selectively directed optical channel may beneficially be shifted by an amount defined by $+2^i\Delta f$ when the first binary representation of the first respective one of the plurality of optical waveguides has an even value. Alternatively still, wherein the first respective one of the plurality of optical waveguides is identified by a first binary representation, the respective optical frequency of the first selectively directed optical channel may beneficially be shifted by an amount defined by $-2^i\Delta f$ when the first binary representation of the first respective one of the plurality of optical waveguides has an odd value. Alternatively even still, wherein the first respective one of the plurality of optical waveguides is identified by a first binary representation, the respective optical frequency of the first selectively directed optical channel may beneficially be shifted by an amount defined by $+2^i\Delta f$ when the first binary representation of the first respective one of the plurality of optical waveguides has an odd value.

In accordance with additional aspects of this exemplary embodiment of the present invention, the apparatus may further beneficially comprise a further switching device for selectively directing the first selectively directed optical channel based at least in part upon the first respective one of the plurality of optical waveguides. Analogously, the further switching device may also beneficially selectively direct the second selectively directed optical channel based at least in part upon the second respective one of the plurality of optical waveguides.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 12 is a table summarizing the non-blocking conditions for unicast multi-log networks.

DETAILED DESCRIPTION OF EXEMPLARY EMBODIMENT(S)

Figure 1:
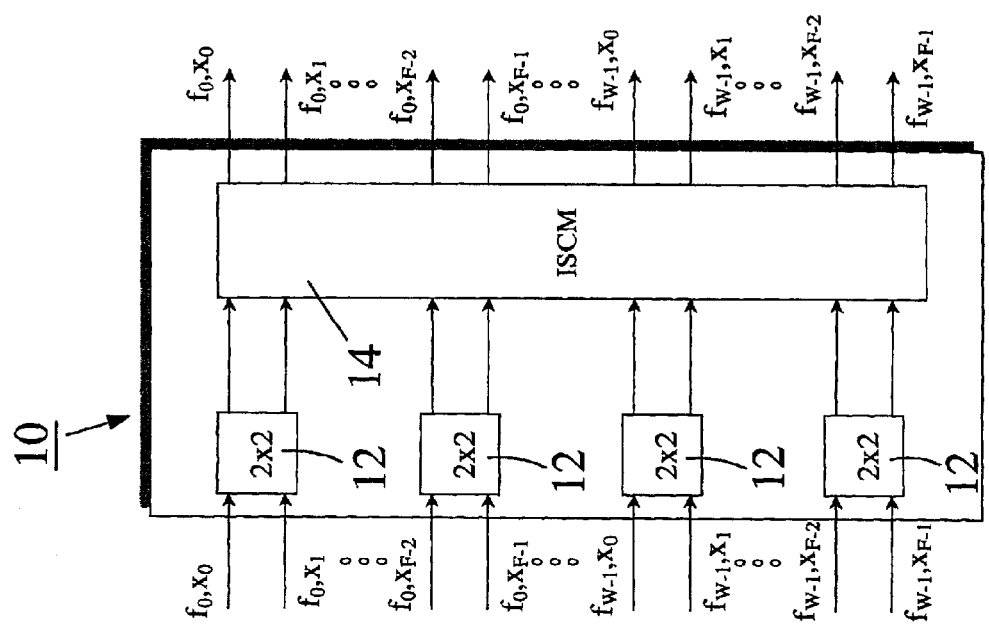
FIG. 1 shows a first stage in a plane of a multi-log wave-mixing cross-connect based upon an unsigned binary representation of frequencies in accordance with the present invention.

The present invention proposes a simple design for non-blocking wave-mixing wavelength-interchanging cross-connects. The basic idea of the present invention is to implement arbitrary frequency conversions by cascades of elementary frequency-selective frequency translations in amounts of $\pm 2^i.\Delta f$, where $\Delta f$ is the frequency spacing and $i=0, \ldots, \log_2 W-1$. The elementary frequency translations are provided with a small number (i.e., negligible compared to F.W, the total number of channels) of shared wave-mixing frequency translation devices. In other words, the present invention leverages bulk wave-mixing frequency conversion, and performs cascaded frequency conversions on individual wavelength channels.

To fully describe the potential of the present invention multi-stage approach, the extensive framework of multi-log networks must be considered. From this perspective, the present invention may be described as multi-log networks enriched with a specific space-frequency arithmetic structure, which assigns a channel with frequency $f_i$ from fiber $x_j$ to inlet or outlet k=F.i+j at any stage. Such a natural labeling of inlets/outlets with wavelength channels guarantees that switching elements remain 2×2 space switches, as they only process signals with the same frequencies. However, the obtained multi-log networks require static (i.e., the inter-stage frequency-conversions do not change according to the network state) frequency-selective frequency conversions to implement inter-stage connection patterns, such as butterfly, shuffle, or inverse-shuffle patterns.

As described in detail below, the key advantage of the present invention is that selected assignment of channels to switch inlets/outlets enables the building of butterfly permutations with a constant number of wave-mixing frequency shifters. From non-blocking multi-log networks using only butterfly inter-stage connection patterns, the present invention allows for an economic construction of multi-log networks using shuffle or inverse-shuffle permutations. It is interesting to note that, unlike traditional switching theory, in accordance with the present invention, butterfly permutations appear more fundamental than shuffle permutations. The present invention also distinguishes between butterfly and shuffle patterns with respect to the minimization of cross-overs in multi-log photonic cross-connects. Further, the present invention naturally extends to multicast multi-log networks, if 2×2 multicast elements are considered. Following is a brief overview of multi-log networks and a detailed description of the new architectures in accordance with the present invention.

Multi-log networks form an important class of multi-stage networks. These interconnection networks usually comprise several identical planes, where each plane has many consecutive stages of switching elements, which are interconnected by specific patterns based on butterfly, shuffle, or inverse-shuffle permutations. The key characteristics of a multi-log network are usually given by an expression of the form $\log_2(N,m,p)$, where N is the size of the network, m is the number of stages appended by horizontal extension, and p is the number of identical planes. A multi-log network may be self-routing (SR), rearrangeably non-blocking (RNB), or strictly non-blocking (SNB), according to specific quantitative relations between the three parameters (N, m, and p) describing the network. These conditions are usually expressed by a minimum number of planes in order to achieve a given level of non-blocking operation. In FIG. 12, there is shown a table summarizing the non-blocking conditions for unicast multi-log networks, where $n=\log_2 N$.

Wavelength-interchanging cross-connects are an example of multi-divisional switches. In such cross-connects, the assignment of channels to inlets and outlets is critical to the design and the performance of the network. Similarly, in the present invention, the assignment of channels to inlets/outlets plays a crucial role in reducing wave-mixing converter requirements. This assignment is described in detail below.

Assume a WDM system with $F=2^\phi$ fibers labeled $x_j$ where $j=0, \ldots, F-1$, and $W=2^w$ optical frequencies of the form $f_i=f_0+i.\Delta f$, where $i=0, \ldots, W-1$. A given channel is denoted by a pair of the form $(f_i,x_j)$, where $f_i$ is the optical frequency of the channel and $x_j$ is the fiber of the channel. Some inlet or outlet k with binary representation $k_{\phi+w-1} \ldots k_0$ is assigned the channel with frequency $f_i$ on fiber $x_j$, where $k_{\phi+w-1} \ldots k_\phi$ is the unsigned binary representation of i, and $k_{\phi-1} \ldots k_0$ is the unsigned binary representation of j. This labeling can also be described as assigning a channel with frequency $f_i$ on fiber $x_j$ to inlet/outlet k=i.F+j. When binary interconnection networks built with 2×2 elements are considered, the above labeling guarantees that switching elements are simple space switches.

Referring to FIG. 1, there is shown a first stage 10 in a plane of a multi-log wave-mixing cross-connect based upon an unsigned binary representation of frequencies in accordance with the present invention. The first stage 10 comprises a plurality of 2×2 space switching elements 12 and an inter-stage connection module (ISCM) 14. The ISCM 14, which connects the plurality of 2×2 space switching elements 12 to a following stage (not shown), also provides basic inter-stage connection patterns including butterfly, shuffle, and inverse-shuffle patterns. Following is a description of how inter-stage connections may be cost-effectively implemented with wave-mixing in accordance with the present invention.

Multi-log networks are based on three fundamental inter-stage permutations that are butterfly, shuffle, or inverse-shuffle. For these permutations, the assignment of channels to inlets/outlets in accordance with the present invention may require wavelength conversion between switching stages. As described in detail below, the use of frequency-selective wave-mixing frequency translation enables the building of butterfly, shuffle, and inverse-shuffle permutations that are compatible with the assignment of channels to inlets or outlets in accordance with the present invention such that wave-mixing converter complexity is between $O(F)$ and $O(F.\log_2 W)$.

For a clearer description of the present invention, let $b_{w-1} \ldots b_0 a_{\phi-1} \ldots a_0$ denote the binary representation of an inlet or outlet k which is assigned a channel with frequency $f_i$ on fiber $x_j$, where $b_{w-1} \ldots b_0$ is the binary representation of i and $a_{\phi-1} \ldots a_0$ is the binary representation of j.

A butterfly permutation $\beta_s$ is defined as the mapping of an outlet from a given stage into an inlet of the next stage, where the binary representation of the next stage inlet index is obtained by simply swapping the least significant digit and the (s+1)-th least significant digit in the binary representation of a current stage outlet index. An arbitrary butterfly permutation $\beta_s$ (where $0<s \leq \phi+w-1$) may be implemented as follows.

If $s<\phi$, the inter-stage connection only involves a spatial permutation of fiber channels. In the permutation, all wavelength channels incoming on some fiber $x_i$ are routed to some outgoing fiber $x_j$, where the binary representation of j is obtained from that of i by swapping the least-significant digit and the (s+1)-th least significant digit of the binary representation of i.

Otherwise, if $\phi \leq s \leq \phi+w-1$, and $b_{s-\phi} \neq a_0$, a channel with frequency $f_i$ incoming on fiber $x_j$ is directed to fiber $x_{j\pm 1}$ and shifted to frequency $f_{i\pm 2^{s-\phi}}$, according to the difference between the least significant digit of the binary representation of j (i.e., $a_0$) and of the (s+1-$\phi$)-th least significant digit of the binary representation of i (i.e., $b_{s-\phi}$). When the fiber has an even index (i.e., j is even), and $b_{s-\phi}=1$, the frequency of the channel is translated by $-2^{s-\phi}.\Delta f$ to $f_{i-2^{s-\phi}}$, and the channel is spatially switched to fiber $x_{j+1}$. When the fiber has an odd index (i.e., j is odd), and $b_{s-\phi}=0$, the frequency of the channel is translated by $+2^{s-\phi}.\Delta f$ to $f_{i+2^{s-\phi}}$, and the channel is spatially switched to fiber $x_{j-1}$. Otherwise (even fiber with $b_{s-\phi}=0$, or odd fiber with $b_{s-\phi}=1$), the frequency and the fiber of the channels are unchanged by a butterfly inter-stage connection module. As mentioned above, the internal architecture of a butterfly inter-stage connection module $\beta_s$ depends on the relative value of s, with respect to $\phi$, where $\phi=\log_2 F$, and F is the total number of fibers in the system.

Figure 2:
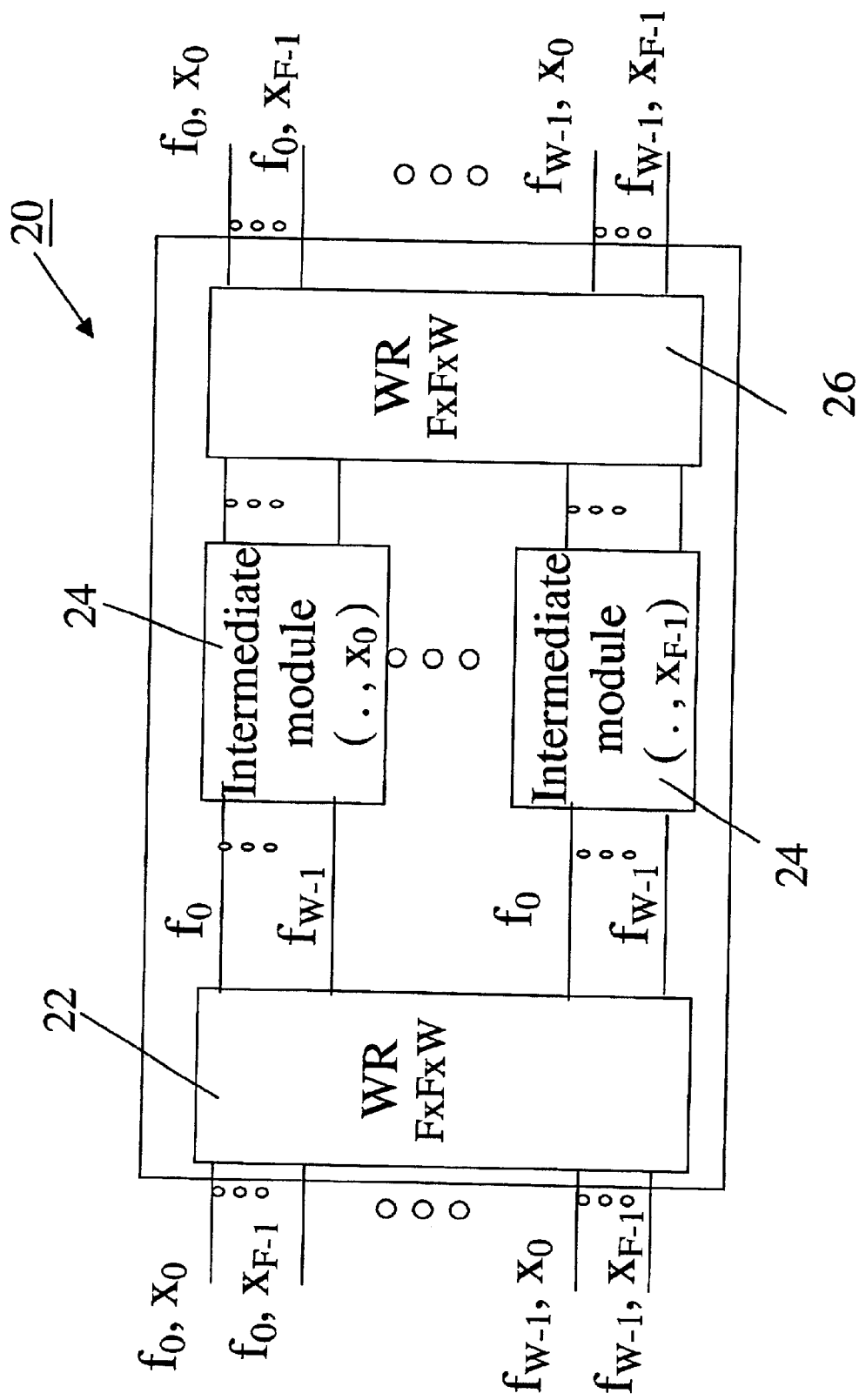
FIG. 2 shows an internal design of a butterfly inter-stage connection module in accordance with the present invention.

Referring to FIG. 2, there is shown an internal design of a butterfly inter-stage connection module 20 when $s \geq \phi$ in accordance with the present invention. The butterfly inter-stage connection module 20 comprises a first static wavelength router 22, a plurality (i.e., F) of intermediate modules 24, and a second static wavelength router 26. The first static wavelength router 22 directs incoming channels to one of the plurality of intermediate modules 24. Each intermediate module 24 accepts W inputs, at different frequencies, from the same fiber. Each intermediate module 24 operates such that a given input or output thereof supports at most one channel.

In order to better describe the internal design of the plurality of intermediate modules 24, some additional notation is helpful. Thus, consider a respective one of the plurality of intermediate modules 24 dedicated to some fiber $x_j$. Let $y_{ji}$ denote a physical input taken by input channel $(f_i,x_j)$ into the respective intermediate module 24. Let $z_{jk}$ denote a k-th physical output from the respective intermediate module 24, where $k=0, \ldots, W-1$. For the respective intermediate module 24 dedicated to fiber $x_j$, input channel $(f_i,x_j)$ is mapped to a specific output channel as follows.

If j is even and $b_{s-\phi}=1$, input channel $(f_i,x_j)$ is directed to input $y_{ji}$ of the respective intermediate module 24, frequency converted to $f_{i-2^{s-\phi}}$, and then directed to a distinct output $z_{jk}$ of the respective intermediate module 24, where $k \leq W/2-1$. The channel is frequency converted in a wave-mixing frequency translation device, such as described in FIG. 3 below.

If j is odd and $b_{s-\phi}=0$, input channel $(f_i,x_j)$ is directed to input $y_{ji}$ of the respective intermediate module 24, frequency converted to $f_{i+2^{s-\phi}}$, and then directed to a distinct output $z_{jk}$ of the respective intermediate module 24, where $k \leq W/2-1$. The channel is frequency converted in a wave-mixing frequency translation device, such as described in FIG. 4 below.

If j is even and $b_{s-\phi}=0$, input channel $(f_i,x_j)$ is directed to input $y_{ji}$ of the respective intermediate module 24, and then directed to a distinct output $z_{jk}$ of the respective intermediate module 24, where $k \geq W/2$.

If j is odd and $b_{s-\phi}=1$, input channel $(f_i,x_j)$ is directed to input $y_{ji}$ of the respective intermediate module 24, and then directed to a distinct output $z_{jk}$ of the respective intermediate module 24, where $k \geq W/2$.

Figure 3:
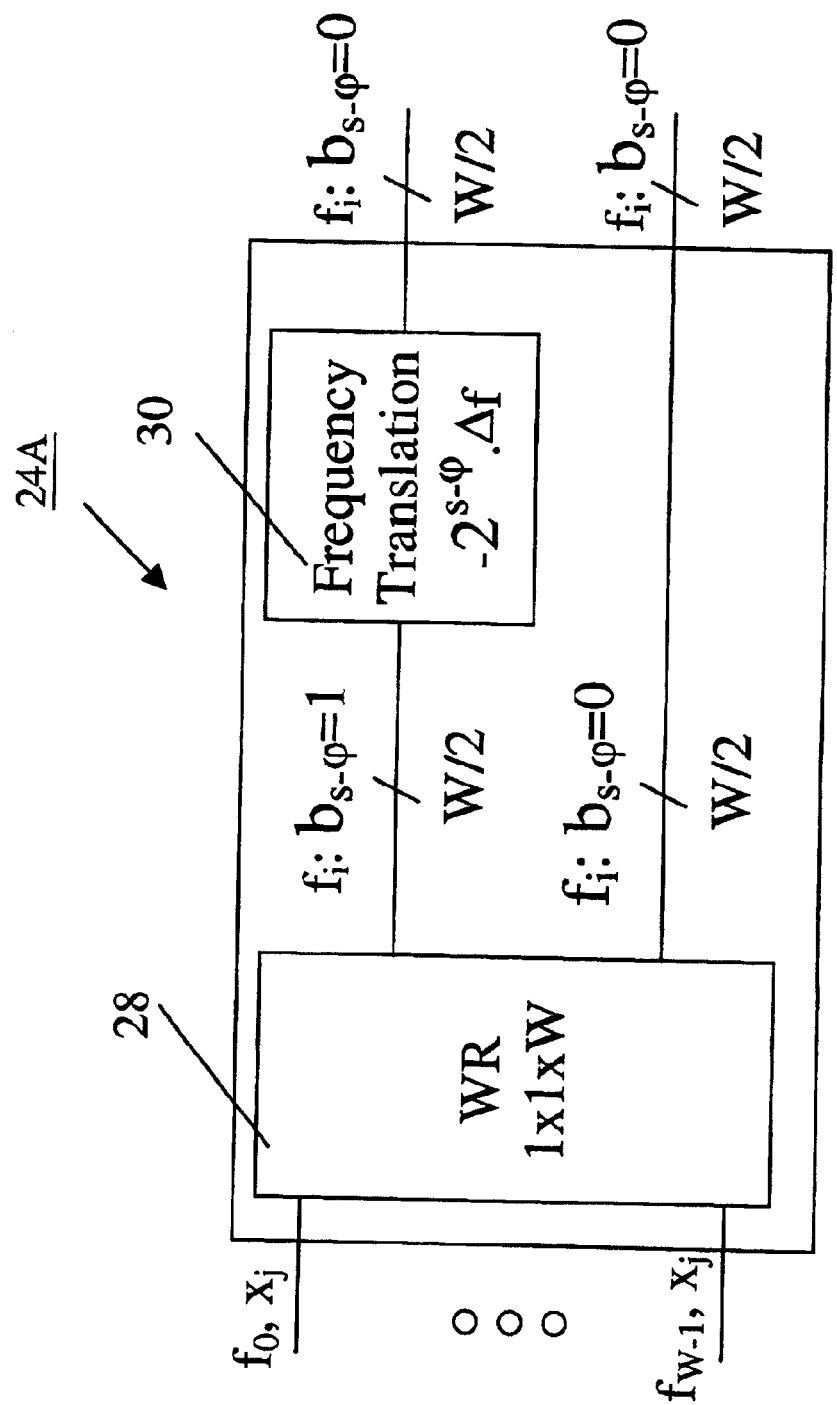
FIG. 3 shows an intermediate module of the butterfly inter-stage connection module shown in FIG. 2 for an even fiber.

Referring to FIG. 3, there is shown an intermediate module 24A for an even fiber $x_j$ (i.e., $j=2k$) when $s \geq \phi$. The intermediate module 24A comprises a wavelength router 28, and a wave-mixing frequency translation device 30 for converting the frequency of input channel $(f_i,x_j)$ from $f_i$ to $f_{i-2^{s-\phi}}$.

Figure 4:
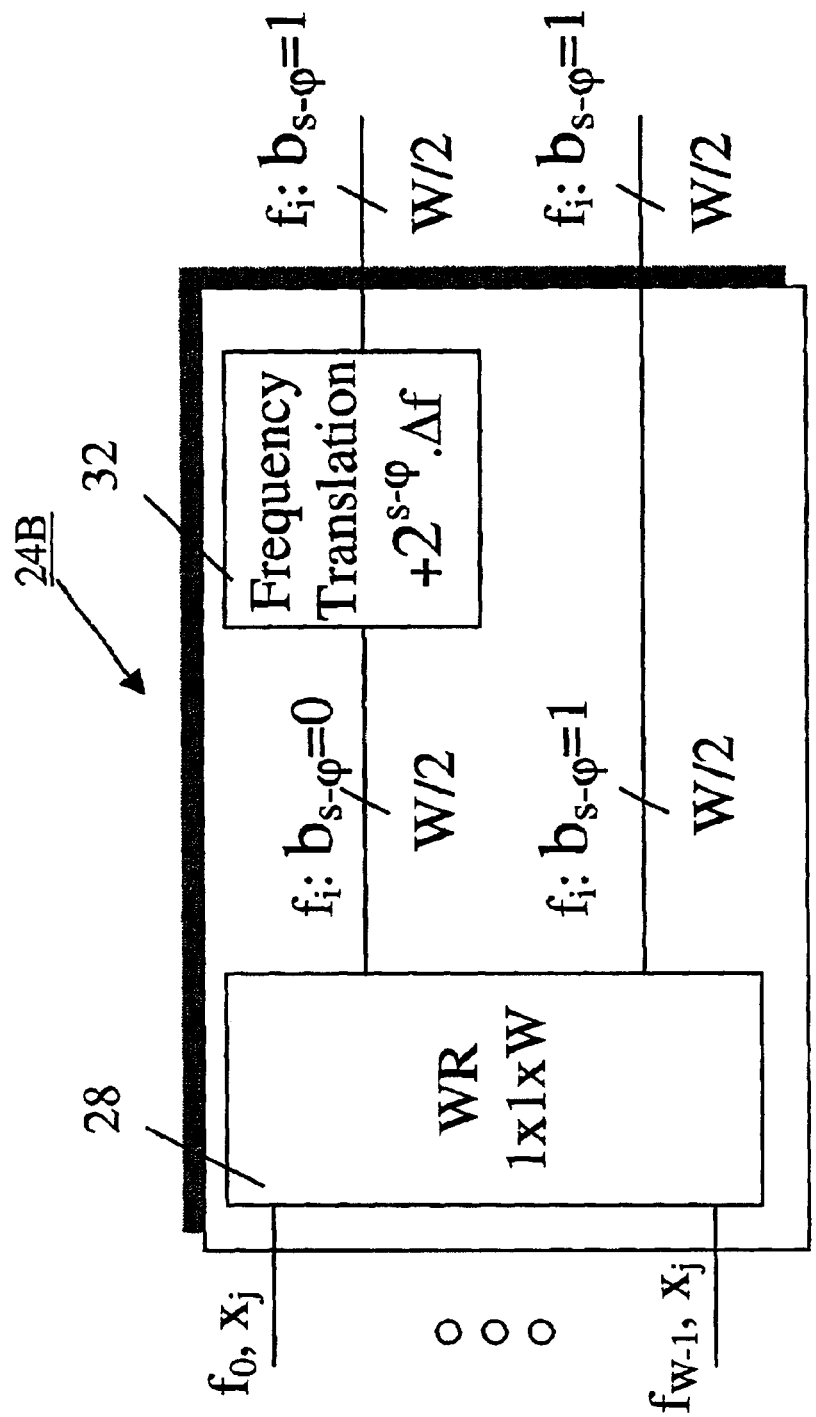
FIG. 4 shows an intermediate module of the butterfly inter-stage connection module shown in FIG. 2 for an odd fiber.

Referring to FIG. 4, there is shown an intermediate module 24B for an odd fiber $x_j$ (i.e., j=2k+1) when $s \geq \phi$. The intermediate module 24B comprises a wavelength router 28, and a wave-mixing frequency translation device 32 for converting the frequency of input channel $(f_i, x_j)$ from $f_i$ to $f_{i+2^{s-\phi}}$.

Outputs from the intermediate modules 24 are sent to the second static wavelength router 26 that spatially directs channels as follows.

Any output $z_{jk}$ from an intermediate module 24 dedicated to an even fiber (i.e., j is even), such that $k \leq W/2 - 1$, is routed to the channel with the same frequency on fiber $x_{j+1}$.

Any output $z_{jk}$ from an intermediate module 24 dedicated to an odd fiber (i.e., j is odd), such that $k \leq W/2 - 1$, is routed to the channel with the same frequency on fiber $x_{j-1}$.

Any other output $z_{jk}$ from an intermediate module 24 is routed to the channel with the same frequency on fiber $x_j$.

When $s < \phi$, the butterfly inter-stage connection is simply provided by a static wavelength router that directs channels as follows.

If $a_s = a_0$, input channel $(f_i, x_j)$ is switched to $(f_i, x_j)$.

Otherwise, input channel $(f_i, x_j)$ is switched to channel $(f_i, x_{j-(2^s-1)(a_s-a_0)})$.

In terms of number of wave-mixing frequency translation devices, the cost of the butterfly inter-stage connection module 20 is either 0 (when $0 < s < \phi$) or F (when $\phi \leq s \leq \phi + w - 1$). Therefore, the worst case requirements for wave-mixing bulk frequency translation device complexity is O(F) for the butterfly inter-stage connection module 20. In each butterfly inter-stage connection module 20, a given channel undergoes at most one frequency conversion. Thus, in the worst case, the number of frequency conversions affecting a given channel is O(1).

Shuffles and inverse shuffles are also key permutations for the construction of multi-log networks. Like butterfly permutations, they can be easily described in terms of bit permutations on the binary representation of inlets and outlets. For example, consider an M×M switch where $M=2^N$. For a given $0 \leq h \leq N-1$, the shuffle $\sigma_h$ does a right-to-left circular permutation of the h+1 least significant digits of the binary representation of outlets. In other words, $\sigma_h$ maps outlet $d_{N-1} d_{N-2} \ldots d_0$ to inlet $d_{N-1} \ldots d_{h+1} d_{h-1} \ldots d_0 d_h$. For a given h, the inverse shuffle permutation $\sigma_h^{-1}$ maps outlet $d_{N-1} d_{N-2} \ldots d_0$ to inlet $d_{N-1} \ldots d_0 d_h \ldots d_1$.

In accordance with the present invention, for a given $0 < s < \phi$, a shuffle $\sigma_s$ (or inverse-shuffle $\sigma_s^{-1}$) permutation reduces to a wavelength routing operation. Otherwise, it requires wavelength-selective frequency conversions.

When $s \geq \phi$, using a butterfly inter-stage connection module as described above, and horizontally extended SW-Banyan topologies (a SW-Banyan self-routing topology only uses butterfly inter-stage connections), a $\log_2(F.W, \phi + w - 1, 1)$ rearrangeably non-blocking wavelength-interchanging network may be implemented with $O(F.\log_2 W)$ wave-mixing frequency translation devices. Indeed, such a network has one plane, where $2\log_2 W$ butterfly inter-stage connection modules would actually perform wave-mixing frequency conversions and the remaining inter connections provide simple wavelength routing.

The above-described rearrangeably non-blocking wavelength-interchanging network may be statically configured to provide the required shuffle or inverse shuffle permutations. The worst case wave-mixing frequency translation device complexity of a shuffle or inverse-shuffle permutation would be $O(F.\log_2 W)$, while for any connection, the number of cascaded frequency conversions would at most be $O(\log_2 W)$.

At this point it should be noted that the architecture described above with respect to FIG. 1 may also support multicast connections when the 2×2 switching elements 12 have multicast capabilities. No change is required regarding the ISCM 14. Also, non-blocking conditions associated with multicast structures can be used to obtain the required number of planes.

In comparing the overall wave-mixing frequency translation device complexity of the present invention cross-connects with that of previous solutions, the large reductions observed can be ascribed to the optimal exploitation off powerful bulk frequency conversion in wave-mixing frequency translation devices. Although the quantitative comparison has not been extended to multicast networks, results are expected to be even more dramatic in those cases.

For networks based on butterfly permutations, the wave-mixing frequency translation device complexity of a butterfly inter-stage connection pattern $\beta_s$ is null (i.e., no frequency conversion takes place) if $0 < s < \phi$, and O(F) otherwise, as previously mentioned. Extended SW-Banyan networks are examples of multi-log networks based on butterfly permutations. In such networks, there are at most $2\log_2 W$ frequency converting butterfly inter-stage connections (when the network is horizontally extended with $m = \phi + w - 1$ extra stages). Therefore, the wave-mixing frequency translation device complexity per plane is at most $O(F.\log_2 W)$. According to the non-blocking conditions for multi-log networks, it is possible to implement the following butterfly-based non-blocking networks: 1.) a $\log_2(F.W, \phi + w - 1, 1)$ rearrangeably non-blocking network with $O(F.\log_2 W)$ wave mixing frequency translation devices; and 2.) a $\log_2(F.W, \phi + w - 1, \phi + w)$ strictly non-blocking network with $O(F.\log_2 W . \log_2(F.W))$ wave-mixing frequency translation devices. In both cases, the resulting wave-mixing frequency translation device complexity is substantially reduced compared to previous designs with O(F.W) converter complexity, especially when there is a large number of wavelengths.

For networks based on shuffle or inverse-shuffle permutations, the wave-mixing frequency translation device complexity of a shuffle or inverse-shuffle inter-stage permutation $\sigma_s$ is null (i.e., no frequency conversion takes place) if $0 < s < \phi$, and $O(F.\log_2 W)$ otherwise, as previously mentioned. A shuffle-based (or inverse-shuffle based) network usually has at most $2\log_2 W$ frequency converting shuffle inter-stage connection patterns. Therefore, referring to non-blocking conditions for unicast multi-log networks, the following shuffle-based non-blocking networks may be implemented: 1.) a $\log_2(F.W, \phi + w - 1, 1)$ rearrangeably non-blocking Benes network with $O(F.(\log_2 W)^2)$ wave-mixing frequency translation devices; and 2.) a $\log_2(F.W, \phi + w - 1, \phi + w)$ strictly non-blocking Cantor network with $O(F.(\log_2 W)^2 . F.\log_2 W)$ wave-mixing frequency translation devices. As with the butterfly permutations, the wave-mixing frequency translation device complexity for shuffle or inverse-shuffle permutations is substantially smaller than O(F.W), especially when the number of wavelengths per fiber increases.

Figure 5:
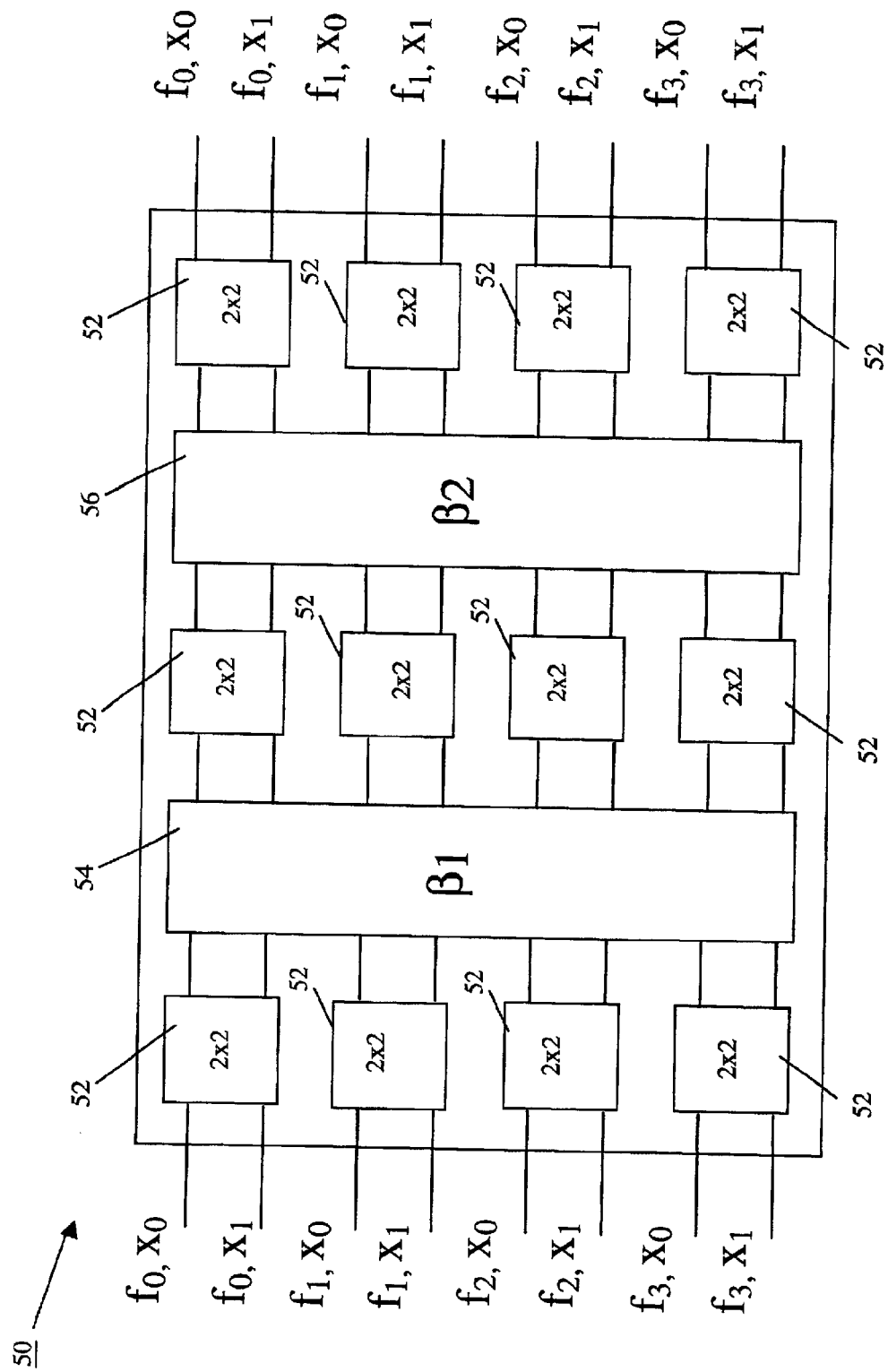
FIG. 5 shows one plane of a strictly non-blocking $\log_2$ (F.W,0,p) vertically-replicated single wavelength Banyan wavelength-interchanging cross-connect in accordance with the present invention.

At this point it is helpful for an overall understanding of the present invention to provide an example of a wavelength-interchanging cross-connect utilizing the present invention techniques. Thus, referring to FIG. 5, there is shown one plane 50 of a strictly non-blocking $\log_2(F.W, 0, p)$ vertically-replicated SW-Banyan wavelength-interchanging cross-connect, where F=2, W=4 (i.e., φ=1, and w=2), and p=2w+φ−m+1/2+m−1=3. The cross-connect plane 50 comprises a plurality of 2×2 switching elements 52 (arranged into three separate switching stages), a first inter-stage connection module (ISCM) 54, and a second inter-stage connection module (ISCM) 56.

Figure 6:
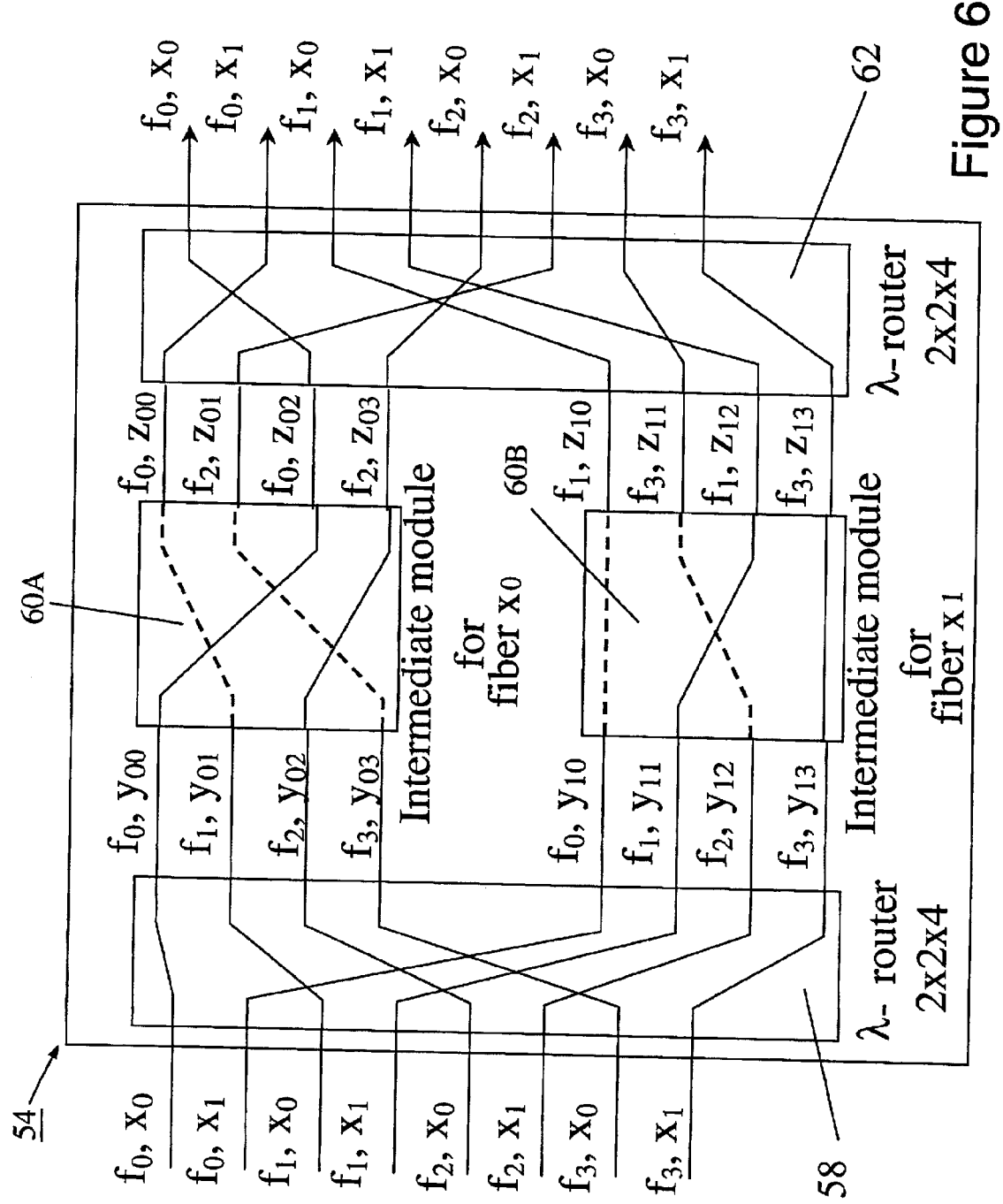
FIG. 6 shows a detailed view of a first inter-stage connection module of the cross-connect shown in FIG. 5.

Referring to FIG. 6, there is shown a detailed view of the first ISCM 54. The first ISCM 54 comprises a first static wavelength router 58, a first intermediate module 60A, a second intermediate module 60B, and a second static wavelength router 62. The first intermediate module 60A selectively shifts frequencies from an even fiber (i.e., fiber $x_0$) by 0 or −Δf according to the frequencies of the input channels. The second intermediate module 60B selectively shifts frequencies from an odd fiber (i.e., fiber $x_1$) by 0 or +Δf according to the frequencies of the input channels.

Figure 7:
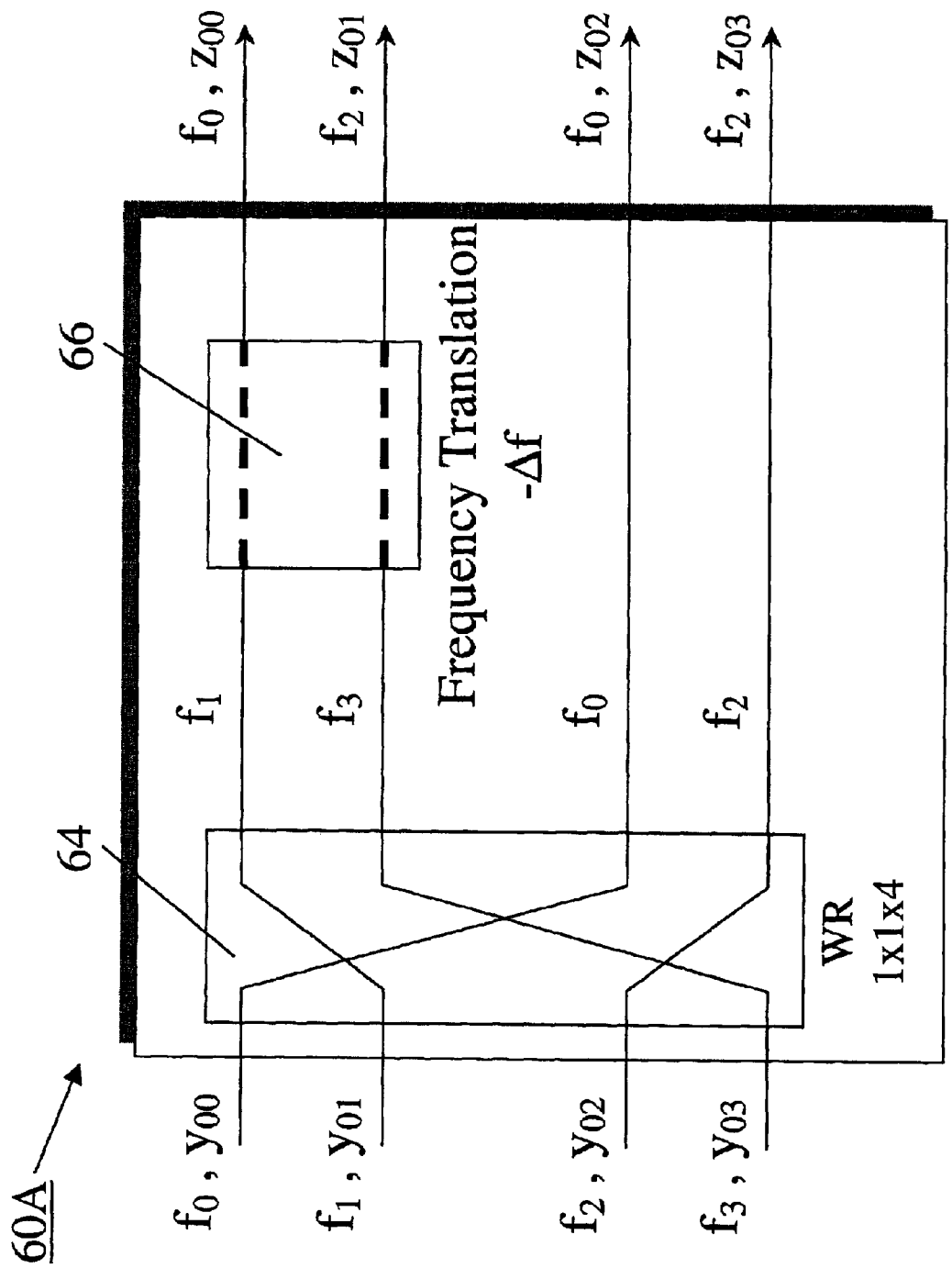
FIG. 7 shows a detailed view of a first intermediate module of the first inter-stage connection module shown in FIG. 6.

Referring to FIG. 7, there is shown a detailed view of the first intermediate module 60A. The first intermediate module 60A comprises a wavelength router 64, and a wave-mixing frequency translation device 66 for selectively shifting frequencies from the even fiber (i.e., fiber $x_0$) by 0 or −Δf according to the frequencies of the input channels.

Figure 8:
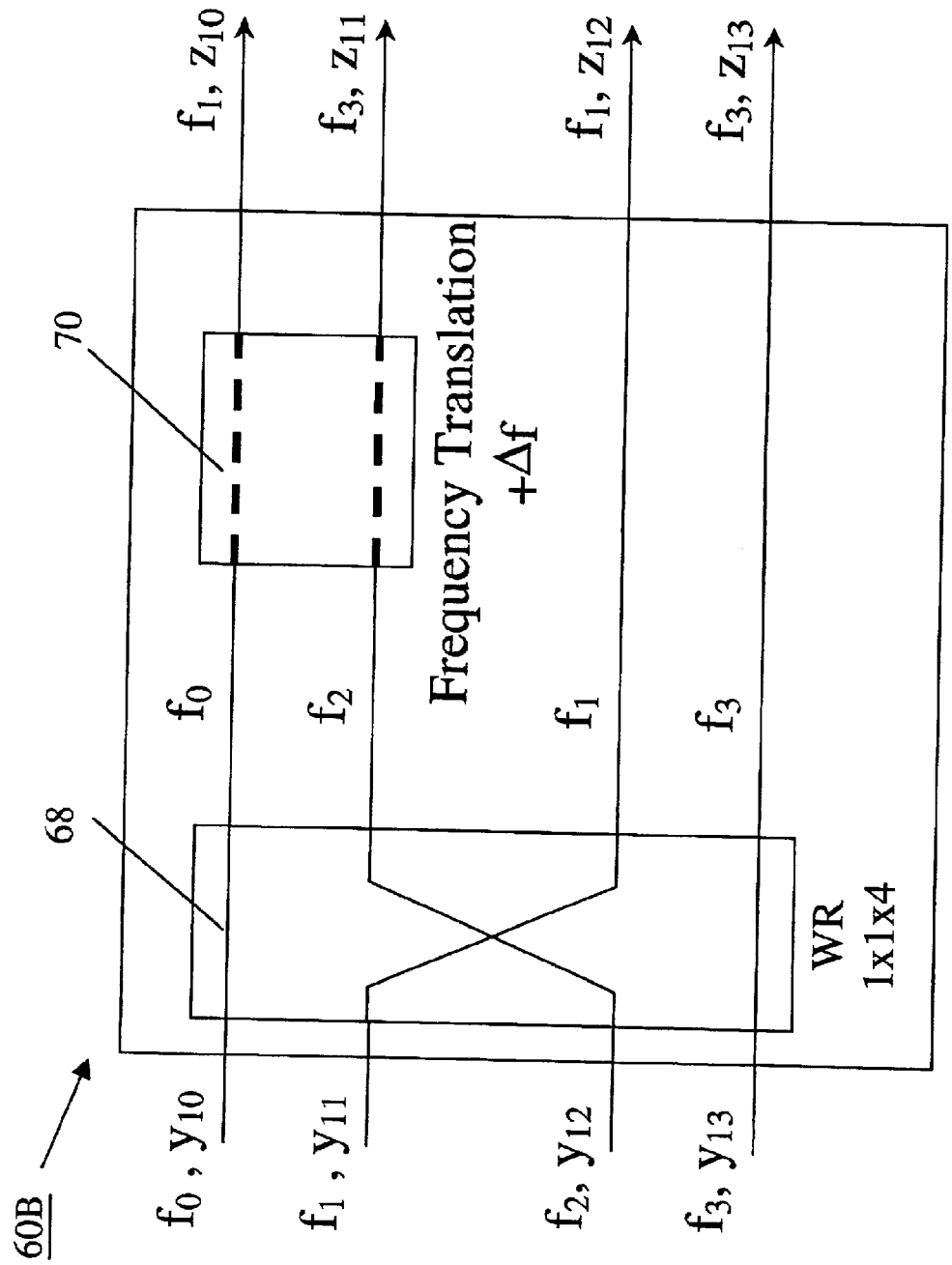
FIG. 8 shows a detailed view of a second intermediate module of the first inter-stage connection module shown in FIG. 6.

Referring to FIG. 8, there is shown a detailed view of the second intermediate module 60B. The second intermediate module 60B comprises a wavelength router 68, and a wave-mixing frequency translation device 70 for selectively shifting frequencies from the odd fiber (i.e., fiber $x_1$) by 0 or +Δf according to the frequencies of the input channels.

Figure 9:
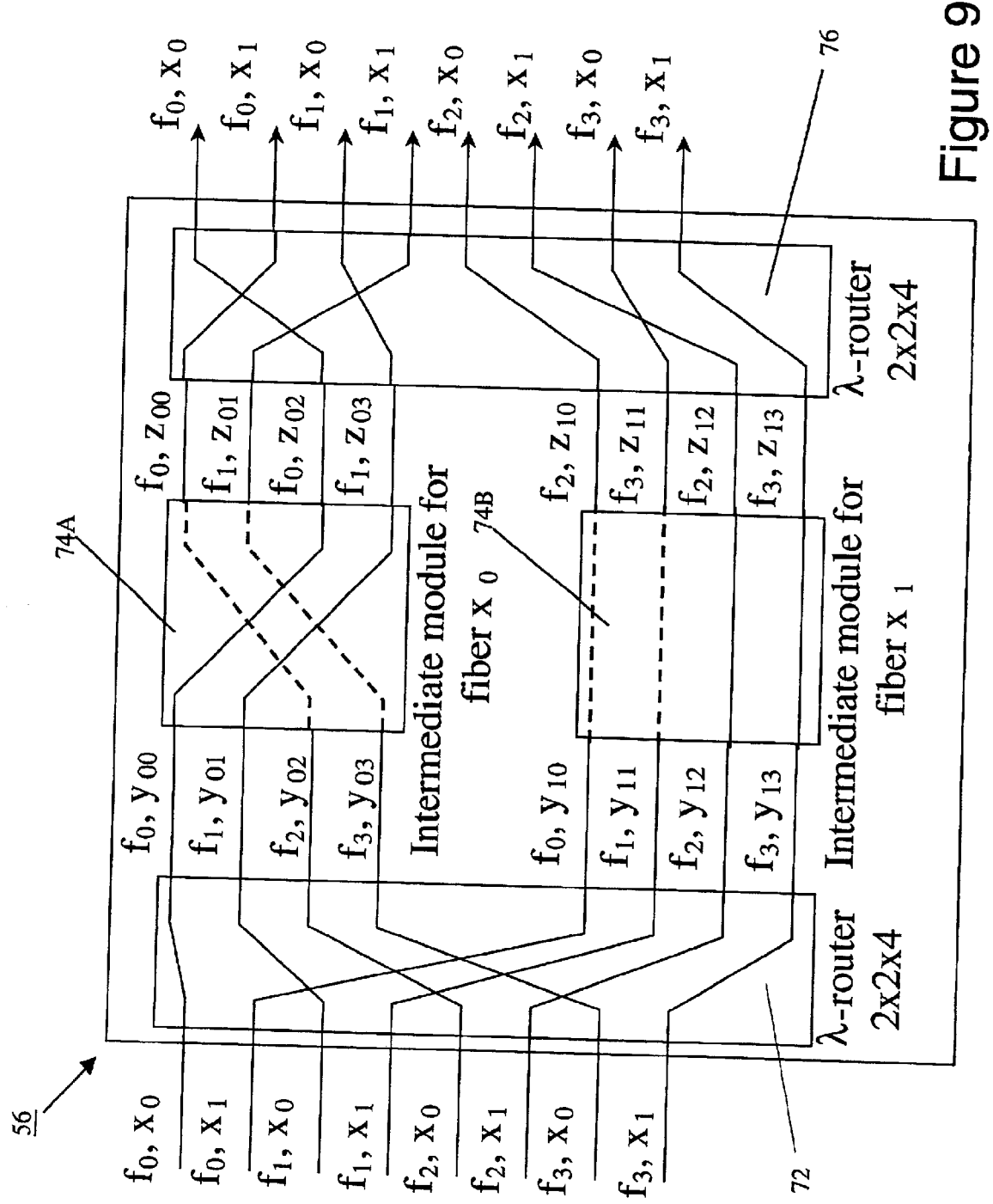
FIG. 9 shows a detailed view of a second inter-stage so connection module of the cross-connect shown in FIG. 5.

Referring to FIG. 9, there is shown a detailed view of the second ISCM 56. The second ISCM 56 comprises a first static wavelength router 72, a first intermediate module 74A, a second intermediate module 74B, and a second static wavelength router 76. The first intermediate module 74A selectively shifts frequencies from an even fiber (i.e., fiber $x_0$) by 0 or −2Δf according to the frequencies of the input channels. The second intermediate module 74B selectively shifts frequencies from an odd fiber (i.e., fiber $x_1$) by 0 or +2Δf according to the frequencies of the input channels.

Figure 10:
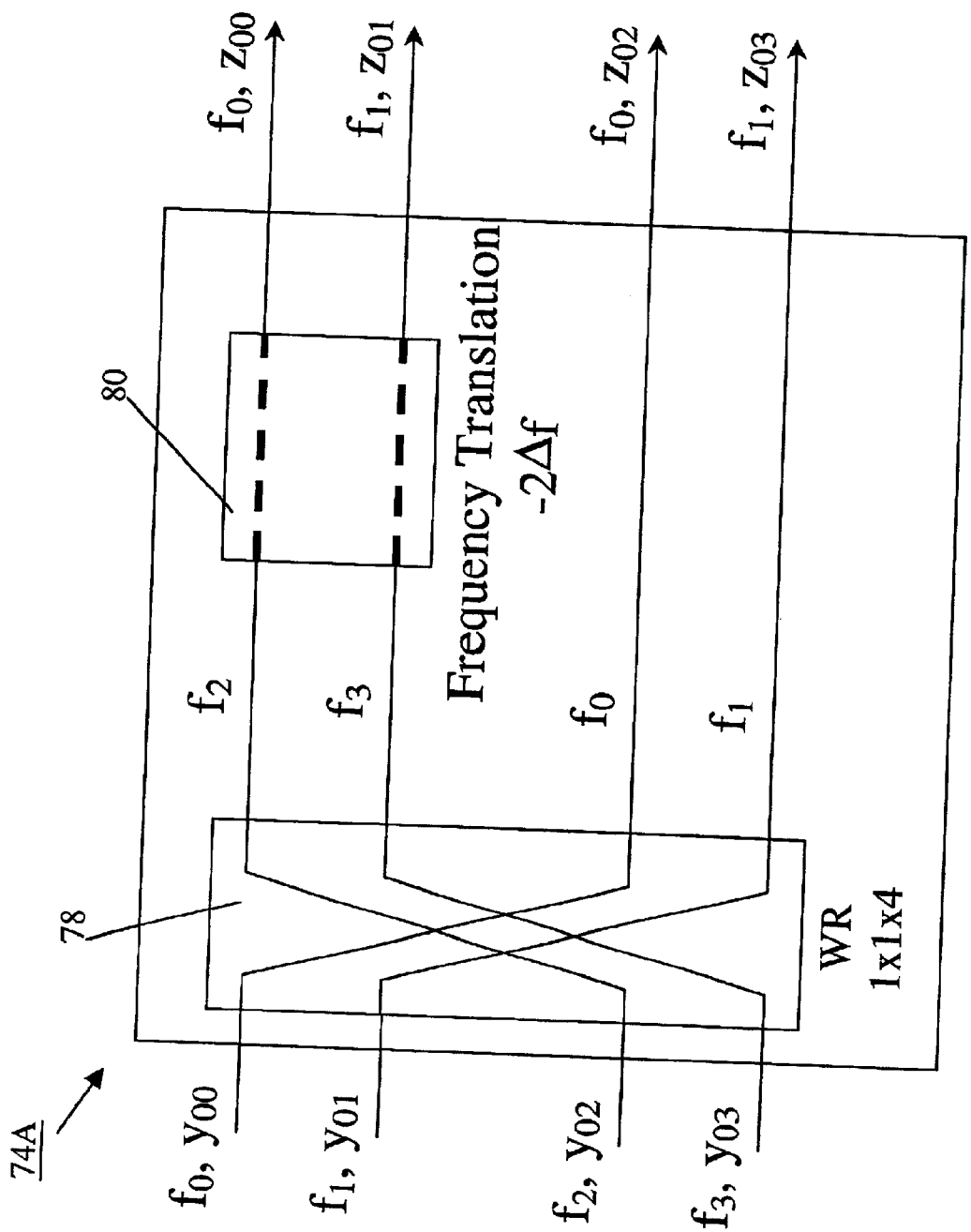
FIG. 10 shows a detailed view of a first intermediate module of the second inter-stage connection module shown in FIG. 9.

Referring to FIG. 10, there is shown a detailed view of the first intermediate module 74A. The first intermediate module 74A comprises a wavelength router 78, and a wave-mixing frequency translation device 80 for selectively shifting frequencies from the even fiber (i.e., fiber $x_0$) by 0 or −2Δf according to the frequencies of the input channels.

Figure 11:
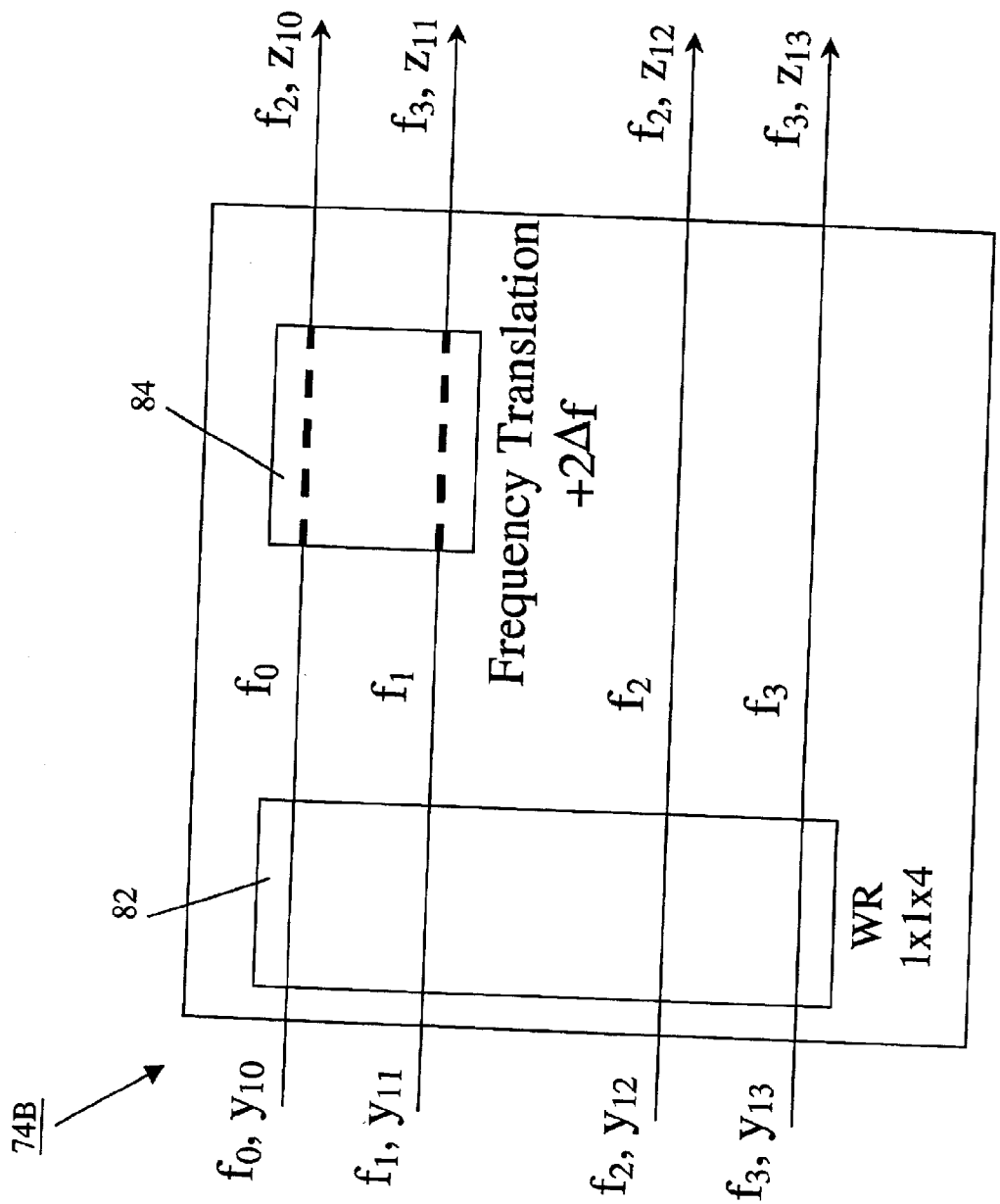
FIG. 11 shows a detailed view of a second intermediate module of the second inter-stage connection module shown in FIG. 9.

Referring to FIG. 11, there is shown a detailed view of the second intermediate module 74B. The second intermediate module 74B comprises a wavelength router 82, and a wave-mixing frequency translation device 84 for selectively shifting frequencies from the odd fiber (i.e., fiber $x_1$) by 0 or +2Δf according to the frequencies of the input channels.

The above-described cross-connects 10 and 50 both utilize wave-mixing frequency translation devices, which frequency shift a number of channels at distinct carrier frequencies by a frequency-independent amount. Such wave-mixing frequency translation devices may be implemented using difference-frequency generation (DFG). DFG in periodically poled lithium niobate waveguides is currently the most promising technique to implement such wave-mixing frequency translation devices due to the high conversion efficiencies, low pump power requirements, and mature manufacturing processes associated therewith.

A single pump DFG wave-mixing frequency translation device maps an input frequency $f_{in}$ to an output frequency $f_{out}=f^p-f_{in}$, where $f^p$ is the pump frequency. This is equivalent to a mirror-image mapping around a central frequency $f^p/2$. However, at the output, in addition to the frequency converted signals, DFG wave-mixing also produces amplified versions of the input signals at their original frequencies. Thus, DFG wave-mixing can generate in-band cross-talk when input signals have frequencies distributed on both sides of the central frequency $f^p/2$, although this cross-talk is well below that due cross-mixing terms in four-wave mixing. In any event, to address this cross-talk problem, a simple approach with two DFG wave-mixing frequency translation devices processing two disjoint sets of frequencies can be used in accordance with the present invention. Alternatively, to implement bulk wave-mixing frequency translations, two cascaded DFG wave-mixing frequency translation devices with differing pump frequencies may be used in accordance with the present invention.

To summarize the above, the present invention provides a new family of non-blocking photonic cross-connects. This new family of non-blocking photonic cross-connects support all-optical frequency conversion, and exploit wave-mixing bulk frequency conversion. The cross-connects have particularly low wavelength-converter requirements of between $O(F)$ and $O(F.\log_2 W)$ per plane and per stage. Assuming an F.W×F.W multi-log network, with F fibers and W regularly spaced optical frequencies of the form $f_i = f_0 + i.\Delta f$, where $f_0$ is the base frequency and Δf is the frequency spacing, the assignment of wavelength channels to inlets or outlets is such that the channel with frequency $f_i$ and fiber $x_j$ is assigned to inlet or outlet k=i.F+j, where 0≦i≦W−1, and 0≦j≦F−1. In other words, an inlet or outlet k corresponds to the frequency $f_i$ with index i=⌊k/F⌋, and to the fiber $x_j$ with index j=k mod F. With this convention, binary multi-log wavelength-interchanging cross-connects may be implemented using 2×2 space-switching elements, and inter-stage connection modules providing static frequency conversions, in accordance with the present invention.

In multi-log networks, inter-stage connection modules may be of three types including: butterfly, shuffle, and inverse shuffle. A butterfly inter-stage connection module is usually denoted by $\beta_h$, where 0<h≦n−1, n being the logarithm of the size of the network. The butterfly inter-stage connection module operates by mapping an outlet of a given stage into an inlet of a following stage such that the binary representation of the inlet is obtained from that of the outlet by swapping the least and the (h+1)-th least significant digits of the inlet.

With the channel-to-inlet (or channel-to-outlet) assignment described above, a butterfly permutation $\beta_h$ may be implemented by a combination of wavelength routing operations and wavelength-selective frequency translations in amounts equal to $-2^{h-\phi}.\Delta f$, 0, or $2^{h-\phi}.\Delta f$, where h≧φ, and by simple wavelength routing operations otherwise, where φ=$\log_2(F)$. Cascaded wave-mixing frequency translation devices easily provide such frequency translations in a bulk manner (i.e., they can simultaneously apply a constant frequency shift to a set of input signals at different carrier frequencies). Indeed, two cascaded difference-frequency conversions controlled by different pump frequencies result in a frequency-translation operation. Therefore, in the above-described channel-to-inlet and channel-to-outlet mappings, a given butterfly permutation may be implemented with at most 2 bulk wave-mixing frequency translation devices per fiber. This implementation allows multi-log networks to be built based solely on butterfly permutations with particularly low wave-mixing frequency translation device complexity. These networks may be built with horizontal extensions and vertical replications of the SW-Banyan self-routing topology. For example a rearrangeably non-blocking $\log_2(F.W,\phi+w-1,1)$ extended SW-Banyan network has a wave-mixing converter complexity of $O(F.\log_2 W)$, while a strictly non-blocking $\log_2(F.W, \phi+w-1, \phi+w)$ extended and replicated SW-Banyan network has a converter complexity of $O(F.\log_2 W.\log_2(F.W))$. With non-blocking extended and replicated SW-Banyan multi-log networks, shuffle and inverse shuffle inter-stage connection modules may be built with $O(F.\log_2 W)$ wave-mixing frequency translation devices. This allows for the possibility to construct any multi-log network with a wave-mixing converter complexity per stage and per plane of between $O(F)$ and $O(F.\log_2 W)$.

The converter complexity of the present invention networks is greatly reduced compared to previous non-blocking designs having a converter complexity of $O(F.W)$. The present invention may be easily extended to multi-log multicast wavelength-interchanging cross-connects by only considering multicast 2×2 switching elements and specific non-blocking conditions.

Summarizing further, the present invention proposes a simple design for multi-log wavelength-interchanging cross-connects. The present invention technique exploits bulk wave-mixing frequency conversion and extends the traditional framework of multi-log networks by considering a specific assignment of wavelength channels to inlets and outlets. This assignment is such that an inlet or an outlet k is assigned the channel with frequency $f_i$ on fiber $x_j$, where $i=\lfloor k/F \rfloor$ and $j=k \bmod F$. Resulting non-blocking architectures have converter requirements of between $O(F)$ and $O(F.\log_2 W)$ per stage and per plane. Thus, overall converter requirements remain well below those of previous designs having converter costs of $O(F.W)$.

The present invention technique has many advantages over previous designs including reduced converter requirements, fully coherent operation (e.g., all switching operations are coherent including frequency conversions, although this is not the case for wavelength conversion with cross-gain modulation), large bandwidth, as well as fault-tolerance. These advantages translate into increased switching flexibility, an increased service envelope including services requiring coherent operation (such as the distribution of cable television channels), and lower switch costs.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for selectively frequency translating optical channels in a system having W optical frequencies, the method comprising the steps of:
    selectively directing an optical channel operating at a respective one of the W optical frequencies based at least in part upon the respective optical frequency of the optical channel; and
    shifting the respective optical frequency of the in selectively directed optical channel by an amount defined by $\pm 2^i \Delta f$, wherein $\Delta f$ is an optical frequency spacing between adjacent optical channels, and $i=0, 1, \ldots \log_2 W-1$.

2. The method as defined in claim 1, wherein the optical channel is a first optical channel and the selectively directed optical channel is a first selectively directed optical channel, further comprising the step of:
    selectively directing a second optical channel operating at another respective one of the W optical frequencies based at least in part upon the respective optical frequency of the second optical channel, wherein the respective optical frequency of the second selectively directed optical channel is the same as the respective optical frequency of the first selectively directed optical channel after it has been shifted.

3. The method as defined in claim 2, wherein the system comprises a plurality of optical waveguides for communicating the W optical frequencies, wherein a first respective one of the plurality of optical waveguides communicates the first optical channel prior to being selectively directed, further comprising the step of:
    selectively directing the first optical channel based at least in part upon the first respective one of the plurality of optical waveguides.

4. The method as defined in claim 3, wherein a second respective one of the plurality of optical waveguides communicates the second optical channel prior to being selectively directed, further comprising the step of:
    selectively directing the second optical channel based at least in part upon the second respective one of the plurality of optical waveguides.

5. The method as defined in claim 4, wherein the first respective one of the plurality of optical waveguides is identified by a first binary representation, wherein the respective optical frequency of the first selectively directed optical channel is shifted by an amount defined by $-2^i \Delta f$ when the first binary representation of the first respective one of the plurality of optical waveguides has an even value.

6. The method as defined in claim 4, wherein the first respective one of the plurality of optical waveguides is identified by a first binary representation, wherein the respective optical frequency of the first selectively directed optical channel is shifted by an amount defined by $+2^i \Delta f$ when the first binary representation of the first respective one of the plurality of optical waveguides has an even value.

7. The method as defined in claim 4, wherein the first respective one of the plurality of optical waveguides is identified by a first binary representation, wherein the respective optical frequency of the first selectively directed optical channel is shifted by an amount defined by $-2^i \Delta f$ when the first binary representation of the first respective one of the plurality of optical waveguides has an odd value.

8. The method as defined in claim 4, wherein the first respective one of the plurality of optical waveguides is identified by a first binary representation, wherein the respective optical frequency of the first selectively directed optical channel is shifted by an amount defined by $+2^i \Delta f$ when the first binary representation of the first respective one of the plurality of optical waveguides has an odd value.

9. The method as defined in claim 4, further comprising the step of:
    selectively directing the first selectively directed optical channel based at least in part upon the first respective one of the plurality of optical waveguides.

10. The method as defined in claim 9, further comprising the step of:
    selectively directing the second selectively directed optical channel based at least in part upon the second respective one of the plurality of optical waveguides.

11. An apparatus for selectively frequency translating optical channels in a system having W optical frequencies, the apparatus comprising:

at least one switching device for selectively directing an optical channel operating at a respective one of the W optical frequencies based at least in part upon the respective optical frequency of the optical channel; and at least one optical frequency shifting device for shifting the respective optical frequency of the selectively directed optical channel by an amount defined by $\pm 2^i \Delta f$, wherein $\Delta f$ is an optical frequency spacing between adjacent optical channels, and $i=0, 1, \ldots \log_2 W-1$.

12. The apparatus as defined in claim 11, wherein the optical channel is a first optical channel and the selectively directed optical channel is a first selectively directed optical channel, wherein the at least one switching device also selectively directs a second optical channel operating at another respective one of the W optical frequencies based at least in part upon the respective optical frequency of the second optical channel, wherein the respective optical frequency of the second selectively directed optical channel is the same as the respective optical frequency of the first selectively directed optical channel after it has been shifted.

13. The apparatus as defined in claim 12, wherein the system comprises a plurality of optical waveguides for communicating the W optical frequencies, wherein a first respective one of the plurality of optical waveguides communicates the first optical channel prior to being selectively directed, further comprising:

at least one other switching device for selectively directing the first optical channel based at least in part upon the first respective one of the plurality of optical waveguides.

14. The apparatus as defined in claim 13, wherein a second respective one of the plurality of optical waveguides communicates the second optical channel prior to being selectively directed, wherein the at least one other switching device also selectively directs the second optical channel based at least in part upon the second respective one of the plurality of optical waveguides.

15. The apparatus as defined in claim 14, wherein the first respective one of the plurality of optical waveguides is identified by a first binary representation, wherein the respective optical frequency of the first selectively directed optical channel is shifted by an amount defined by $-2^i \Delta f$ when the first binary representation of the first respective one of the plurality of optical waveguides has an even value.

16. The apparatus as defined in claim 14, wherein the first respective one of the plurality of optical waveguides is identified by a first binary representation, wherein the respective optical frequency of the first selectively directed optical channel is shifted by an amount defined by $+2^i \Delta f$ when the first binary representation of the first respective one of the plurality of optical waveguides has an even value.

17. The apparatus as defined in claim 14, wherein the first respective one of the plurality of optical waveguides is identified by a first binary representation, wherein the respective optical frequency of the first selectively directed optical channel is shifted by an amount defined by $-2^i \Delta f$ when the first binary representation of the first respective one of the plurality of optical waveguides has an odd value.

18. The apparatus as defined in claim 14, wherein the first respective one of the plurality of optical waveguides is identified by a first binary representation, wherein the respective optical frequency of the first selectively directed optical channel is shifted by an amount defined by $+2^i \Delta f$ when the first binary representation of the first respective one of the plurality of optical waveguides has an odd value.

19. The apparatus as defined in claim 14, further comprising:

a further switching device for selectively directing the first selectively directed optical channel based at least in part upon the first respective one of the plurality of optical waveguides.

20. The apparatus as defined in claim 19, wherein the further switching device also selectively directs the second selectively directed optical channel based at least in part upon the second respective one of the plurality of optical waveguides.

* * * * *